Patented Aug. 10, 1948

2,446,947

UNITED STATES PATENT OFFICE 2,446,947

POLYMERIZATION PROCESS

John C. Munday, Cranford, and Robert V. J. McGee, Elizabeth, N. J., assignors to Standard Oil Development Company, a corporation of Delaware No Drawing. Application January 19, 1946, Serial No. 642,393

10 Claims. (Cl. 260—683.15)

This invention relates to a process for producing high yields of isobutene trimer (tri-isobutylene) or $C_{12}$ polymers in polymerizing isobutene or mixed butenes by sulfuric acid.

In the past, processes for polymerizing pure isobutene or isobutene in refinery $C_4$ cuts were developed to produce chiefly the dimer (di-isobutylene) or $C_8$ polymer used in preparing iso-octane. High yields of dimer are obtained by the action of 50–70% sulfuric acid on isobutene at temperatures of the order of 180° to 225° F. The trimer and heavier polymers formed at the expense of the dimer yields have been by-products of limited utility.

An object of this invention is to provide a method of controlling a sulfuric acid polymerization of isobutene, alone or mixed with normal butenes as in a refinery $C_4$ cut, to give optimum yields of $C_{12}$ polymers (tri-isobutene and cotrimers of isobutene with normal butenes), desirable as a principal product for the manufacture of high antiknock safety fuels, rather than dimers, and with restricted formation of polymers heavier than $C_{12}$ polymers.

A further object is to provide a process which gives optimum yields of trimers efficiently with short contact time, economy in energy, and economy in equipment.

Attainment of the foregoing with other specific objects and advantages will become apparent from the following description:

In sulfuric acid polymerization, there are a number of complicated factors, including acid strength, temperature, and contact time, which affect polymer selectivity. By polymer selectivity is meant the relative concentrations or distribution of the various polymers formed in the reaction mixture by the main reaction and secondary reactions.

Previous attempts to produce the trimers in high yields were not practically successful on account of failure to correlate the factors in polymerizing isobutene or mixed butenes. Also, in attempts to copolymerize isobutene monomer with its dimer to form trimer, there was a lack of understanding of the proper acid strength and of the rapid rates of reaction which are encountered.

First considering the factors individually, the type and degree of the reactions can now be demonstrated to be affected by small variations in the strength of the acid. With relatively weak acid strengths of 70% and lower, dimer formation tends to predominate at polymerization temperatures above 140° F. effective for obtaining high polymer yields. With relatively strong acid strengths of 80% and higher, the formation of tetramers and heavier polymers becomes excessive in obtaining high polymer yields. Optimum acid strengths between 70% and 80% favor the formation of trimer while polymer yields are increased with control of temperature and other factors to be discussed.

In using the optimum acid strengths, between 70% and 80%, the butenes polymerize almost instantaneously at temperatures as low as 35° F. to form optimum yields of $C_{12}$ polymers. In the upper part of the optimum temperature range (about 120° F. to 140° F.), the yield of trimers begins to drop sharply, while bottoms formation becomes excessive. In the preferred intermediate part of the optimum temperature range (about 45° to 120° F.), the yields of polymers lighter and heavier than $C_{12}$ polymers are satisfactorily low from the beginning of the reaction until peak yields of trimer are formed. The best yields are realized at temperatures near 80° F. with optimum acid strengths between 70% and 80%, and particularly near 75%, with other factors properly controlled.

The factor of contact time is somewhat complex. Contact time between the reactive butenes and the acid during reaction should take into account the extent or degree of contact dependent on the degree of dispersion of the butene monomers in the acid and also their dilution. Increased dispersion, for example, by the use of various atomizing or agitating means, and increased concentration of the reactive monomers in the feed both have an effect similar to the effect of increasing the time of contact. Increasing the time or extent of contact after the optimum yield of $C_{12}$ polymers is formed tends to increase copolymerization between the butenes, leading to increase of codimers and excessive amounts of heavier polymers or bottoms.

Although a very short contact time, e. g., a fraction of a minute, is adequate to obtain optimum yields of $C_{12}$ polymers at optimum temperatures with optimum acid strength, it is difficult to state a general optimum contact time on account of the complexities entering into this factor. The optimum time may vary from a few seconds to a number of minutes, depending upon the character of the reactant feed, the rate of feed relative to the acid, degree of dispersion, etc. In general, about 5 minutes appears to be a maximum of contact time necessary with ordinary dispersion of the monomers. It is advantageous to use even a shorter contact time with a limited degree of contact.

The determination of the polymer selectivity factor offers a suitable indication of proper degree and time of contact and leads to the proper selection of conditions for various feeds in obtaining increased yields of $C_{12}$ polymers with low yields of bottoms.

The formation of varying proportions of polymers lighter and heavier than $C_{12}$ polymers is unavoidable, the tetramers and heavier polymers being formed to excess mainly at the expense of dimers and trimers of isobutene with increase in contact time after the optimum yields of trimers and cotrimers are obtained. Accordingly, by limiting contact of the monomers with the acid, optimum polymer selectivity prevails when a major volume proportion of the polymers formed in the reaction mixture is $C_{12}$ polymers. The proportions of polymers are conveniently determined in volume percentages. When the volume of polymers heavier than $C_{12}$ polymers begins to substantially exceed a final volume of polymers lighter than $C_{12}$ polymers, the optimum contact time is also exceeded, and contact of the polymers with the acid should be ended, for then the yields of undesired polymers become high with no substantial improvement in yields of desired $C_{12}$ polymers.

Dimers recovered from the polymer products have valuable uses themselves, but are capable of being converted to trimers. They may be recycled to a reaction zone in which isobutene monomer is being polymerized to trimer or be reacted under optimum conditions in another reaction zone, alone or with isobutene monomer. As immediate formation of tetramers and heavier polymers is favored at low polymerization temperatures, and thereafter the tetramers and heavier polymers increase with contact time at the expense of dimers, the dimers are best converted to trimers alone or admixed with monomers at temperatures in a preferred range of 90° F. to 120° F. in a short contact time, generally less than 30 minutes and preferably less than 5 minutes, to avoid excessive formation of heavier polymers. Thus, the time of reaction or proportion of admixed dimers is governed by the same polymer selectivity rule, namely, that the proportion of $C_{12}$ polymers should be higher than that of lighter and heavier polymers and contact of the polymers with the acid should be ended before the volume proportion of heavier polymers substantially exceeds the volume proportion of the lighter polymers.

Since short contact time was found to favor the formation of $C_{12}$ polymers with optimum acid strengths and temperatures, the possibility of eliminating or modifying the extraction step was investigated. Results indicated that surprisingly high yields of $C_{12}$ polymers can be obtained with a simple one-step process, eliminating a preliminary absorption or extraction step. An extraction step with sulfuric acid strength above 70% is not very selective at convenient extraction temperatures, and it actually has the effect of increasing the contact time. The $C_{12}$ polymer yield was 73% by volume of total polymer in a two-step process in which 75% acid was used first to absorb at 32° F., as compared to a yield of 85% in a one-step process with 75% acid. Furthermore, the amount of bottoms formed in the one-step process was only half that formed in the two-step process.

It further follows from observation of the factors described that more refrigeration is necessary for selective absorption of isobutene from a refinery $C_4$ cut if acid of above 70% strength is used. However, in a more satisfactory two-step method, isobutene is first extracted by a relatively weak acid (about 70% or lower) at moderate temperatures (32° F. to 90° F.), after which the acid strength in the extract is increased by addition of make-up acid for subsequent polymerization with optimum acid strength between 70% and 80%. Acid separated from the polymers thus formed may be recycled for addition to the extract, may be partly used for making up the weaker acid used in the extraction step, and may also be used in a separate step of converting dimers fractionated from the polymerization products, the conversion conditions being adjusted to favor formation of trimer, as explained, e. g., with temperatures in the range 90° F. to 120° F. and short contact time.

In general, the effects of the described factors (acid strength, temperature, contact time, and polymer selectivity) are similar in polymerizing isobutene mixed with normal butenes in refinery $C_4$ cuts to their effects in polymerizing pure isobutene to form high yields of trimers. Results obtained in a one-step polymerization of butenes in a $C_4$ cut indicated a lower trimer yield and higher bottoms formation based on total polymer yield, but remarkably, the yield of $C_{12}$ polymer based on isobutene in the feed is about the same as when pure isobutene is polymerized under the same optimum trimer-forming conditions. The yield of trimers and cotrimers from the mixed butenes is considerably higher with 75% acid than with 70% or weaker acid, and also considerably higher than with 80% or stronger acid. The optimum yields of trimers with between 70% and 80% acid are obtained in the optimum temperature range 35° F. to 140° F., more preferably 40° F. to 120° F. On approaching 140° F., the yield of isobutene trimer drops rapidly but the yield of cotrimers is increased. Increasing contact time and dispersion, likewise, increase isomerization and copolymerization reflected in higher yields of less desirable codimer, intermediates, and bottoms.

For the sake of illustration, representative data will be given in the following tables, which demonstrate effects of the various factors and compare results from preferred embodiments.

TABLE I

Polymerization of isobutene in one-step process effects of acid strength and temperature

[Acid depth in reactor, 17 inches; fritted glass disperser]

| Acid Strength, Per Cent $H_2SO_4$ | 65 | 70 | 70 | 75 | 75 | 75 | 80 | 80 | 80 |
|---|---|---|---|---|---|---|---|---|---|
| Temperature, °F | 140 | 78 | 140 | 45 | 80 | 140 | 45 | 80 | 140 |
| Polymer Yield: | | | | | | | | | |
| Wt. Per Cent Total on Isobutene | 76 | 64 | 91 | 80 | 96 | 95 | 95 | 100 | 97 |
| Wt. Per Cent $C_{12}$ on Isobutene | 47 | 50 | 59 | 67 | 82 | 63 | 74 | 58 | 37 |
| Product Distribution, Vol. Per Cent: | | | | | | | | | |
| Dimer (212–221° F.) | 25 | 9 | 12 | 2 | 4 | 9 | 0 | 0 | 3 |
| Codimer (221–257° F.) | 4 | 2 | 11 | 3 | 3 | 12 | 2 | 4 | 5 |
| Intermediate (257–338° F.) | 2 | 2 | 4 | 1 | 4 | 8 | 3 | 10 | 10 |
| Trimer (338–356° F.) | 62 | 77 | 61 | 82 | 80 | 50 | 71 | 42 | 28 |
| Cotrimer (356–374° F.) | 0 | 1 | 4 | 2 | 5 | 11 | 8 | 16 | 10 |
| Bottoms (374° F.+) | 7 | 9 | 8 | 10 | 4 | 10 | 16 | 28 | 44 |

To obtain the data summarized in Table I a feed stock of 96 to 97% isobutene was used. The series of runs was made at equal contact time. The data clearly demonstrate that the optimum acid strength is between 70% and 80% and that the optimum temperature is in the range 45° F. to 140° F. Although the total polymer yield for 80% acid might appear good, it will be noted that the bottoms yield is high for a nearly pure isobutene feed.

TABLE II

Polymerization of refinery $C_4$ cut in one-step process effects of acid strength and temperature

[Acid depth in reactor, 17 inches; fritted glass disperser]

| | | | | | |
|---|---|---|---|---|---|
| Acid Strength, Per Cent $H_2SO_4$ | 70 | 75 | 75 | 90 | 80 |
| Temperature, °F | 140 | 80 | 140 | 80 | 140 |
| Polymer Yield: | | | | | |
| Wt. Per Cent Total on Isobutene | 85 | 116 | 135 | 161 | 181 |
| Wt. Per Cent $C_{12}$ on Isobutene | 49 | 79 | 57 | 63 | 49 |
| Product Distribution, Vol. Per Cent: | | | | | |
| Dimer | 3 | 0 | 0 | 0 | 0 |
| Codimer | 14 | 7 | 8 | 5 | 6 |
| Intermediate | 11 | 8 | 17 | 11 | 7 |
| Trimer | 44 | 50 | 26 | 25 | 12 |
| Cotrimer | 13 | 18 | 16 | 14 | 12 |
| Bottoms | 15 | 17 | 33 | 45 | 63 |

For the runs shown in Table II, a typical refinery $C_4$ cut containing 17.5% isobutene and 37.9% n-butenes was used as a feed stock. The data show that the optimum acid strength and reaction temperature are required for satisfactory yields of $C_{12}$ polymers. The large amount of n-butenes in the feed makes the bottoms excessive with 80% acid.

TABLE III

Polymerization of refinery $C_4$ cut in one-step process effects of acid depth and dispersion

[75% $H_2SO_4$; 80° F.]

| Disperser | Fritted Glass | Alundum | | |
|---|---|---|---|---|
| Acid Depth, Inches | 17 | 4 | 10 | 17 |
| Polymer Yield: | | | | |
| Wt. per cent Total on Isobutene | 116 | 141 | 139 | 190 |
| Wt. per cent $C_{12}$ on Isobutene | 79 | 66 | 72 | 72 |
| Product Distribution, Vol. per cent: | | | | |
| Dimer | 0 | 0 | 0 | 0 |
| Codimer and Intermediate | 15 | 29 | 29 | 36 |
| Trimer | 50 | 31 | 37 | 20 |
| Cotrimer | 18 | 16 | 15 | 18 |
| Bottoms | 17 | 24 | 19 | 26 |

The data compared in Table III illustrate effects of different degrees of dispersion and varied acid depths. In all these runs the contact time of the feed with the acid was less than about 35 seconds. It can be seen that the degree of dispersion may be excessive even in a very short contact time and result in low yields of desired $C_{12}$ polymers.

TABLE IV

Polymerization of isobutene in two-step process effects of acid strength, temperature and contact time

[Absorption at 32° F.; isobutene/$H_2SO_4$ mol ratio 0.45]

| | | | |
|---|---|---|---|
| Acid Strength, percent $H_2SO_4$ | 75 | 75 | 75 |
| Polym. Temp., °F | 140 | 140 | 140 |
| Time at Polym. Temp., Min | <1 | 5 | 30 |
| Polymer Yield: | | | |
| Wt. percent Total on Isobutene | 98 | 99 | 99 |
| Wt. percent $C_{12}$ on Isobutene | 72 | 72 | 73 |
| Product Distribution, Vol. percent: | | | |
| Dimer | 13 | 9 | 1 |
| Codimer | 6 | 8 | 10 |
| Intermediate | 1 | 2 | 6 |
| Trimer | 69 | 69 | 70 |
| Cotrimer | 4 | 4 | 4 |
| Bottoms | 7 | 8 | 9 |

The data in Table IV illustrate effects of contact time even in a two-step process, showing that after about one minute, the bottoms, codimer, and intermediate polymers are increased at the expense of dimer with no substantial improvement in yields of $C_{12}$ polymers.

TABLE V

Copolymerization of isobutene and dimer

[75% $H_2SO_4$; isobutene/dimer/$H_2SO_4$ mol ratios: 1/1/0.45]

| | | | |
|---|---|---|---|
| Temperature, °F | 86 | 104 | 140 |
| Product Distribution, Vol. per cent: | | | |
| Dimer and Codimer | 24 | 35 | 41 |
| Trimer | 54 | 51 | 40 |
| Cotrimer | 0 | 1 | 8 |
| Bottoms | 22 | 13 | 11 |

It can be seen from the data in Table V that the isobutene monomer reacts best with the dimer at temperatures between 80° F. and 140° F., more particularly in the range 90° F. to 120° F., to form trimer with restricted amounts of bottoms.

The process with control of factors that increase the yield of $C_{12}$ polymers is adapted for practice with existing types of equipment used in producing the dimer chiefly. Changes may be readily made for the preferred introduction of fortifying acid to the reaction mixture passed to the polymerization zone. For a two-step process, a liquid refinery $C_4$ feed stock may be treated in a conventional absorber under sufficient pressure to maintain a completely liquid system about 5 to 30 p. s. i.); then the acid-hydrocarbon emulsion may be flowed from the absorber over to a settler, whence spent (unabsorbed) $C_4$ is released, acid is recycled, and olefin-acid extract is pumped to a polymerization reactor.

If relatively weak acid, e. g., below 70% sulfuric acid, is to be used in the absorption stage with moderate refrigeration at temperatures in the range 32° F. to 90° F., fortifying acid is preferably added to the olefin-acid extract as it is passed to the polymerization reactor in order to obtain the optimum acid strength between 70% and 80% in the reaction mixture.

To obtain the advantages of shortened contact time in promoting the formation of $C_{12}$ polymers with low bottoms yield, a polymerization tube in series with cooling means may be used in place of mixing and time tanks commonly employed in apparatus for acid polymerization of isobutene to its dimer. The olefin-acid reaction mixture may be passed rapidly through the polymerization zone, e. g., in a fraction of one minute or a few minutes, and the polymerization reaction may then be quickly arrested by cooling the reaction mixture. Since no substantial agitation is needed, a once-through flow of the reaction mixture gives the desired conversion. The pressure in the polymerization zone may be maintained sufficiently high to keep the mixture in liquid phase, e. g., at 40 p. s. i. or somewhat higher, while the mixture is at an optimum reaction temperature in the range 35° F. to 140° F.

In a simplified one-step process for production of $C_{12}$ polymer in high yields, pure isobutene or a refinery $C_4$ feed may be bubbled through a column of the sulfuric acid of optimum strength and the polymer product may then be carried by unreacted gases from the surface of the acid catalyst into a settler, where any acid carried over is separated from the polymer for reuse. The olefins and the acid catalyst may be mixed and flowed concurrently through a tubular reactor maintained at the desired temperature. Then the polymer products may be quickly separated from the acid.

The polymer products separated from the acid catalyst may be neutralized and fractionated to recover, as separate fractions, a dimer cut or a mixture of dimer with codimer, a cut of intermediates, or the intermediates mixed with dimer and with codimer, a trimer cut or a mixture of trimer with cotrimer in a C$_{12}$ polymer fraction, and a tetramer cut or bottoms fraction. As previously explained, the dimer cut may be recycled for addition to the reaction mixture in the polymerization zone or may be treated in a separate reactor for conversion into trimer under optimum conditions.

Samples of C$_{12}$ polymer fractions obtained in using optimum conditions were hydrogenated to prepare saturated fuel ingredients. Two methods of treating the polymer products were employed:

(1) Hydrogenation of total polymer products followed by fractionation, and (2) Distillation of the polymer followed by hydrogenation of the individual cuts.

The hydrogenations were carried out by Raney nickel catalyst at 300° to 350° F. and 800 pounds per square inch hydrogen pressure. The A. S. T. M. clear octane number of the hydrogenated codimer was about 96 and that of the hydrogenated C$_{12}$ polymer fraction was about 99. The 1C value with 4 cc. tetraethyl lead for the hydrogenated C$_8$ and C$_{12}$ polymers were 106 and 109, respectively. The high anti-knock values of the hydrogenated C$_{12}$ polymer fractions indicated that satisfactory branched polymers were produced.

It will be evident that the present invention provides a method wherein several factors are controlled to favor high yields of the desired C$_{12}$ butene polymers, more particularly the trimers of isobutene, with minimal amounts of heavier polymers. The effects of each important factor has been explained in detail and illustrations have been given of technical advantages gained in controlling these factors separately and in combination. Through the control of these factors the desired optimum yields of C$_{12}$ olefin polymers are obtained with variations in feed stocks, steps, and equipment used in forming the polymerization reaction mixture. Operations used in recovering a final product may also be varied.

The invention is not intended to be limited by the illustrative examples, for modifications come within the spirit and scope of the invention as defined in the appended claims.

We claim:

1. In a process of producing isobutene trimer, the steps which comprise contacting isobutene monomer with sulfuric acid of between 70% and 80% strength at a polymerization temperature between about 35° F. and 140° F., limiting contact of the monomer with the acid to a period less than 5 minutes whereby C$_{12}$ polymers are formed in a major volume proportion with respect to lighter and heavier polymers, and separating the resulting polymer product from the acid before increased formation of said heavier polymers makes their volume proportion exceed a final volume proportion of said lighter polymers and before the volume per cent of said heavier polymers exceeds 10 volume per cent of total polymers formed.

2. In a process of producing isobutene trimer, the steps which comprise contacting gaseous isobutene with sulfuric acid of between 70% and 80% strength at a polymerization temperature between about 35° F. and 140° F., limiting contact of the isobutene with the acid to a period less than 5 minutes whereby C$_{12}$ polymers are formed in a major volume proportion with respect to lighter and heavier polymers, and separating the resulting polymer product from the acid before increased formation of said heavier polymers makes their volume proportion exceed a final volume proportion of said lighter polymers and before the volume per cent of said heavier polymers exceeds 10 volume per cent of total polymers formed.

3. In a process of producing C$_{12}$ polymers of butenes, the steps which comprise contacting iso- and normal butenes with sulfuric acid of between 70% and 80% strength at a polymerization temperature between about 45° F. and 120° F., limiting contact of the butenes with the acid so that C$_{12}$ polymers are a major volume proportion of polymers formed, and separating resulting polymers from the acid before a contact period of about 5 minutes ends, heavier polymers being less than 10 volume per cent of the total polymers formed and less than volume per cent dimers formed.

4. In a process as described in claim 3, the polymers formed just prior to their separation from the acid being made to have a polymer distribution of at least about 50 volume per cent of C$_{12}$ polymers with a smaller volume per cent of heavier polymers than of lighter polymers.

5. In a process of producing isobutene trimer, the steps which comprise contacting isobutene monomer with approximately 75% strength sulfuric acid at a temperature of approximately 80° F. to an extent that the resulting reaction mixture has polymer distribution of a major volume of C$_{12}$ polymers, then separating polymers formed in the reaction mixture from the acid before a contact period of about 5 minutes ends.

6. In a process of producing isobutene trimers, the steps which comprise absorbing isobutene from a refinery C$_4$ cut by sulfuric acid of less than 70% strength at a temperature sufficiently low to prevent substantial polymerization of the absorbed isobutene, separating an acid-extract of the absorbed isobutene from residual sulfuric acid and unabsorbed gas, fortifying the acid in said acid-extract to raise its strength to between 70% and 80%, and polymerizing isobutene in the fortified acid-extract at a temperature in the range 35° F. to 140° F. for a period of time less than 5 minutes.

7. In a process of producing isobutene trimers, the steps which comprise polymerizing isobutene monomer by contact with sulfuric acid of between 70% and 80% strength at a polymerization temperature between about 35° F. and 140° F. in a reaction zone, ending contact of resulting polymers with the acid at the polymerization temperature after a period of time less than 5 minutes, and before their volume exceeds 10 volume per cent of total polymers formed, separating the polymers formed in the reaction mixture from the acid, fractionating the polymers thus separated to recover an isobutene dimer cut, recycling the dimer cut to the reaction zone for further conversion to trimers with isobutene monomer being polymerized therein.

8. In a process of producing C$_{12}$ polymers of butenes, the steps which comprise polymerizing isobutene monomer by contact with sulfuric acid of between 70% and 80% strength at a polymerization temperature between about 32° F. and 140° F., ending contact of polymers formed with the acid at a polymerization temperature before increasing formation of heavier polymers than $C_{12}$ polymers makes the volume of the heavier polymers exceed 10 volume per cent of total polymers formed and exceed a final volume of lighter polymers than $C_{12}$ polymers in the resulting reaction mixture, separating polymers formed in the reaction mixture from the acid, fractionating the polymers thus separated to recover a $C_{12}$ polymer cut and a $C_8$ polymer cut, and converting isobutene dimer in the $C_8$ polymer cut to trimers by contact with sulfuric acid of between 70% and 80% strength at a temperature between 90° F. and 120° F. for a period less than 30 minutes.

9. In a process of producing $C_{12}$ polymers of butenes, the steps which comprise polymerizing isobutene mixed with normal butene monomers in a refinery $C_4$ cut by contact for less than about one minute with sulfuric acid of between 70% and 80% strength at polymerization temperatures in the range of about 35° F. to 140° F. to the extent that in a resulting reaction mixture $C_{12}$ polymers are in major volume proportion of polymers formed, heavier polymers being less than 10 volume per cent of polymers formed and less than volume per cent of dimers formed and thereafter separating polymers formed in the reaction mixture.

10. In a process as described in claim 9, ending polymer formation in said reaction mixture when the $C_{12}$ polymers contain isobutene trimers boiling in the range 338° F. to 356° F. in over twice the volume per cent of cotrimers which boil in the range of 356° F. to 374° F.

JOHN C. MUNDAY.
ROBERT V. J. McGEE.

REFERENCES CITED

The following references are of record in the file of this patent:

UNITED STATES PATENTS

| Number | Name | Date |
|---|---|---|
| 2,171,250 | Archibald | Aug. 29, 1939 |
| 2,205,159 | Stevens et al. | June 18, 1940 |
| 2,258,368 | Stevens et al. | Oct. 7, 1941 |
| 2,314,458 | Stahley et al. | Mar. 23, 1943 |
| 2,321,280 | Brown | June 8, 1943 |
| 2,396,753 | Rosen et al. | Mar. 19, 1946 |

OTHER REFERENCES

Lebedev et al.: Ber., 63, 103–112 (1930). Translation in 260–683.15.